United States Patent
Castro et al.

(10) Patent No.: US 7,503,052 B2
(45) Date of Patent: Mar. 10, 2009

(54) ASYNCHRONOUS DATABASE API

(75) Inventors: Pablo Castro, Bellevue, WA (US);
Blaine Dockter, Duvall, WA (US); Lale Divringi, Bellevue, WA (US); Sharad Sundaresan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 10/824,177

(22) Filed: Apr. 14, 2004

(65) Prior Publication Data

US 2005/0234936 A1    Oct. 20, 2005

(51) Int. Cl.
*G06F 3/00*   (2006.01)
*G06F 9/44*   (2006.01)
*G06F 9/46*   (2006.01)
*G06F 13/00*  (2006.01)
*G06F 7/00*   (2006.01)
*G06F 17/30*  (2006.01)

(52) U.S. Cl. .................. 719/328; 719/313; 719/330; 707/1

(58) Field of Classification Search ............ 719/313, 719/328, 330; 707/1
See application file for complete search history.

(56) References Cited

U.S. PATENT DOCUMENTS

| | | | | |
|---|---|---|---|---|
| 5,097,533 A | * | 3/1992 | Burger et al. | 719/328 |
| 5,544,318 A | * | 8/1996 | Schmitz et al. | 709/207 |
| 5,689,697 A | * | 11/1997 | Edwards et al. | 707/3 |
| 5,822,585 A | * | 10/1998 | Noble et al. | 719/316 |
| 5,857,201 A | * | 1/1999 | Wright et al. | 707/104.1 |
| 6,594,590 B2 | * | 7/2003 | Woods et al. | 702/35 |
| 6,931,436 B2 | * | 8/2005 | Lawrence et al. | 709/217 |
| 7,111,063 B1 | * | 9/2006 | Clark et al. | 709/225 |
| 2004/0068479 A1 | * | 4/2004 | Wolfson et al. | 707/1 |

OTHER PUBLICATIONS

Arcangeli, J.-P. et al., "An API for High-Level Software Engineering of Distributed and Mobile Applications," *Proceedings Eighth IEEE Workshop on Future Trends of Distributed Computing Systems*, Bologna, Italy, Oct. 31-Nov. 2, 2001, 155-161.

Holgate, L., "Using OpenSSL with Asynchronous Sockets," *Windows Developer Magazine*, 2002, 13(10), 10-16.

(Continued)

*Primary Examiner*—Meng-Ai An
*Assistant Examiner*—Qing-Yuan Wu
(74) *Attorney, Agent, or Firm*—Woodcock Washburn LLP

(57) ABSTRACT

An asynchronous database API allows threads to call a database and continue to execute without spawning a thread to wait for the database and without polling the database. The API immediately returns to a caller without waiting for a database operation to complete or for any other external event. A call to an asynchronous database API can invoke an initialization method. The initialization method may validate the input parameters, build them into a message for a database operation, send the message to the database server, and return signal information to the client process thread. Signal information provides a client thread with a way to recognize a signal indicating the return of results from a database. Upon completion of a database operation, a thread can call a finalization method to perform any final step to process the database results and pass the formatted results to the thread.

13 Claims, 12 Drawing Sheets

1. Call Database

2. Continue Operations

3. Receive Results, Continue Operations

OTHER PUBLICATIONS

Koike, A., "APIs for Flow Control and Their Applications," *IEICE Trans. on Communications*, 2001, E84-B(12), 3173-3180.

Lin, M. et al., "Key to the Success of Asynchronous Transfer Mode: An Application Programming Interface," *Proceedings IEEE INFOCOM '97; The Conference on Computer Communications; Sixteenth Annual Joint Conference of the IEEE Computer and Communications Societies; Driving the Information Revolution*, Kobe, Japan, Apr. 7-11, 1997, 3, 1237-1244.

Park, S.-Y. et al., "A High Performance Message-Passing System for Network of Workstations," *J. Supercomputing*, 1997, 11(2), 159-179.

\* cited by examiner

1. Call Database

2. Wait for Results

3. Receive Results, Continue Operations

1. Call Database

2. Continue Operations While Another Thread Waits for Results

3. Receive Results, Continue Operations

1. Call Database

2. Poll Database to determine if operation is complete, receive a "yes" or "no."

3. Repeat step 2 until operation database returns a "yes."

1. Call Database

2. Continue Operations

3. Receive Results, Continue Operations

Saving a document from a GUI may cause a process thread to access a database in which to save the document.

ASYNCHRONOUS DATABASE API

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

This invention generally relates to databases, and more particularly to making function calls to access information stored in databases, and to an asynchronous API for databases.

BACKGROUND OF THE INVENTION

An application programming interface ("API") is a computer process or mechanism that allows other processes to work together. In the familiar setting of a personal computer running an operating system and various applications such as MICROSOFT WORD® and ADOBE ACROBAT READER®, the API allows applications to communicate with the operating system. An application makes calls to the operating system API to invoke operating system services. The actual code behind the operating system API is located in a collection of dynamic link libraries ("DLLs").

Database software can also provide an API. A database API allows processes to make calls to a database to invoke database services. Modern database software such as MICROSOFT SQL SERVER®, IBM DB2®, ORACLE DATABASE®, and SYBASE IQ®, all provides APIs. The vast majority of enterprise applications today use databases, and therefore also use the APIs that allow applications to access and manipulate those databases. It is desirable to provide these applications, whether client-side, middle-tier, or server-side applications, with the most responsive and scalable database API possible. This is especially true for data access-intensive applications.

While databases, operating systems, and other applications may provide APIs, there are fundamental differences between a database API and an operating system API. One such difference stems from the fact that an application such as a database typically does not have direct access and control over a system's hardware resources, while an operating system does have such control. A database is a complex application that is supported by the platform of an operating system. Therefore a function call to a database API must be implemented by database software via one or more subsequent function calls to an operating system API—the operating system platform on which the database sits.

The traditional setting for databases versus operating systems may also play a role in the differing course of development for database and operating system APIs. Databases are less prevalent than operating systems, and therefore databases may have been subjected to less commercial development expertise. While operating systems are both local as well as remote, in terms of residing on both client and server devices, databases are more often remote, because they contain a large and valuable supply of data—often too large to be stored locally, but that may be made accessible to multiple client devices. Remote access involves extra complexity in accessing services, because all communications must be properly packaged for remote delivery, and unpackaged at the remote location.

Another difference between database APIs and operating system APIs is the nature of the typical request to such APIs. The services provided by databases are different than those provided by an operating system. For example, a database may be requested to retrieve data that fits a particular description, it may be requested to join data with other data and so on. If a thread requests data from a database, it may be likely that a user has requested the data and is not interested in performing other operations without the requested data.

An operating system is responsible for initiating processes, and for managing memory for processes. Any process running on an operating system may comprise multiple threads. An operating system may be requested to create a new process handle, to exit a current process, to open an existing process, or to terminate an existing process. It may also be requested to create a file, to read a file, to read a buffer from a file into memory, to write a buffer from memory to disk, or to close a handle associated with a kernel object.

Perhaps because of the above differences between database and operating system APIs, database developers have not implemented both synchronous and asynchronous APIs, while operating systems developers have. A synchronous API is one in which a calling thread waits on an operation to complete before proceeding with other activity. An asynchronous API allows a calling thread to initiate an operation, and then continue executing without waiting on the operation to complete or performing some other operation to check on the progress of a database operation. Asynchronous operating system APIs allow threads to call functions such as reading a buffer asynchronously from a file into memory, writing a buffer asynchronously from memory to a disk, and so on. This allows an application to request a save of a document, for example, and move on to other operations without waiting for the document to save to disk.

In contrast, database APIs have traditionally been synchronous. However, with the growth of network computing, the corresponding storage of more and larger data objects in databases, the increase in server-based processes that may perform many operations simultaneously for many different users, and the increased complexity and power of applications requesting database services, this traditional approach may no longer be appropriate.

A traditional synchronous database API is illustrated in FIG. 1. The three steps of FIG. 1 summarize the procedure for obtaining data or other services from a database. In a synchronous arrangement, a process thread 100 first submits a call to a database API 101. The call invokes a requested function of a database 102. For example, the process thread 100 may have requested that the database 102 open a connection or execute a Structured Query Language ("SQL") statement. While the database 102 is carrying out the requested function, the process thread 100 must wait, as illustrated in FIG. 1 step 2. Step 3 shows that upon completion of the requested task, the database 102 can return the results to the process thread 100, and the process thread 100 can finally resume operations.

One problem with a synchronous API 101 such as that of FIG. 1 is the time that a process thread 100 must wait in FIG. 1 step 2. This is time that process thread 100 could productively spend engaging in other tasks. (If the combined processes of FIG. 1 are analogized to a pizza restaurant, the process thread 100 would be an employee, the API 101 would be company procedure, and the database 102 would be the pizza oven. The process thread 100 employee is waiting in front of the database 102 oven for the function call pizza to bake, instead of continuing to grate cheese, chop tomatoes, and mix pizza dough. This is a waste of resources.)

Various partial solutions have been developed in the past to address this waste of resources. These solutions are illustrated in FIG. 2 and FIG. 3. While some of these solutions have been referred to as "nonblocking" database APIs, it will become clear from the following discussion that a nonblocking API is not necessarily the same as an asynchronous API. A nonblocking API may wholly or partially free a given process thread from waiting for a database to return operation results, but requires some dedication of process thread resources to either waiting for or checking on a database while an operation is ongoing. Sample nonblocking scenarios are provided in FIG. 2 and FIG. 3 and the corresponding discussion below. Note that such "nonblocking" APIs are not truly asynchronous in that they do not free all application thread resources from interacting with a database while an operation is carried out by the database.

The solution of FIG. 3 is referred to as "polling." FIG. 3 shows a reconfigured API 103 that allows a process thread 100 to query a database 102 about whether an operation is completed. Once again, the procedure can be demonstrated in three steps. As in FIG. 1, the first step is a function call from the process thread 100 to the API 103. Instead of simply waiting for results regardless of how long it may take, this configuration allows the process thread 100 continue executing, but it must periodically check whether the database 102 has completed the requested operation. The database 102 is "polled," or asked whether an operation is completed. This is illustrated in step 2. The immediate return of "yes" or "no" answer from the database 102 allows the process thread 100 to continue executing, however if the answer is "no," the process thread 100 must again poll the database at a later time to check if the operation is complete. A "yes" answer, on the other hand, may be accompanied by database 102 results, marking the end of a database 102 interaction. The API of FIG. 3 is not full asynchronous, because calling process threads 100 must dedicate resources to repeatedly calling a database 102 until database results are available.

The solution of FIG. 3 is an improvement over the procedure in FIG. 1, but it retains some notable drawbacks. Occasionally a database 102 is bombarded with too many calls, and the responsiveness of the database 102 is impaired. Every time the process thread 100 polls the database 102, it must wait for the "yes" or "no" answer from the database 102. This means waiting for the poll to be packaged and transmitted to a database 102, received, processed and returned by the database 102, and finally received, unpackaged, and delivered to the process thread 100. This is not a truly asynchronous solution because it involved a process thread 100 initiating further communication with a database 102 prior to receiving a signal that an operation is complete. In the pizza restaurant analogy, this is similar to allowing an employee returning to a pizza oven every 10 seconds to check whether a pizza is done, rather than continuing to work and receiving notification by a bell or buzzer that a pizza is done. Again, this is a waste of resources.

FIG. 2 shows another solution that has been partially successful in addressing the problem of blocking process threads when making database calls. Again, three steps are illustrated, and the first step represents a call to a database 102. The second step demonstrates that instead of allowing a thread 100 to wait for results, an application or process can spawn a new thread 104, or waiting thread 104, and allow the waiting thread 104 to wait for the database 102 to return results while the original process thread 100 can continue operations. In FIG. 2 step 3, the database 102 returns results to the waiting thread 104, which can perform the task of communicating the results to the original process thread 100.

Like the solution of FIG. 3, the solution of FIG. 2 is not wholly adequate. Allowing process thread 100 to continue operations despite the time required by a database 102 to return results is an improvement. However, the waiting thread 104 consumes valuable system resources. To analogize once again to a pizza restaurant, the solution of FIG. 3 is akin to hiring a new waiting thread 104 employee for the express purpose of watching the database 102 pizza oven. This allows other employees to go about their work and not watch their pizzas bake, but the waiting thread 104 employee must be paid, thereby consuming system resources, and could be more productively occupied than simply waiting and watching for database 102 pizzas to bake. Again, this is a waste of resources.

In light of the forgoing deficiencies, there is an unaddressed need in the industry to provide an improved database API.

SUMMARY OF THE INVENTION

An asynchronous database API is provided. The asynchronous database API allows threads to call a database and continue to execute without spawning a thread to wait for a database and without polling a database. In other words, thread resources are not necessary to wait on database operations. The API can immediately return to a calling thread without waiting for a database operation to complete and without waiting for any other external event. This immediate return allows threads to continue executing without waiting for a response from the database, and without spawning a new thread to wait for a return. A call to an asynchronous database API can invoke an initialization method. The initialization method may validate the input parameters, build them into a message for a database operation, send the message to the database server, and return signal information to the client process thread. Signal information provides a client thread with a way to recognize a signal indicating the return of results from a database. Several varieties of signal information are event objects and objects with Boolean flags. A callback function may also be passed to an initialization method to notify a thread of a completed database operation. Upon completion of a database operation, a thread can call a finalization method to perform any final step to process the database results and pass the formatted results to the thread.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview of the Invention

This section provides an overview of components and aspects of the invention that are explained in greater detail below.

Figure 5:
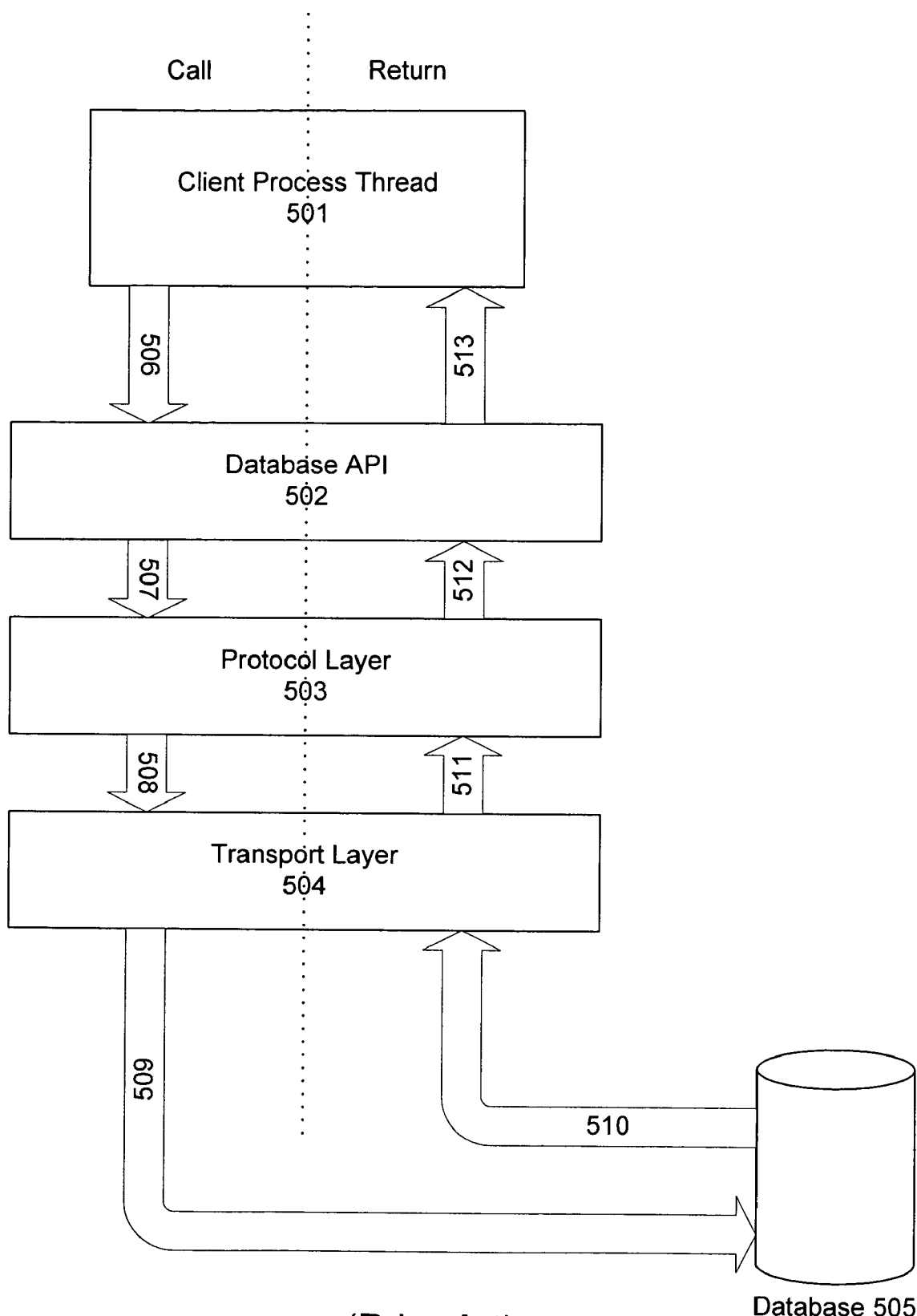
FIG. 5 illustrates a prior art structure for packaging and delivering a call to a database, and subsequently returning results to the calling thread that must wait in the interim.
Figure 6:
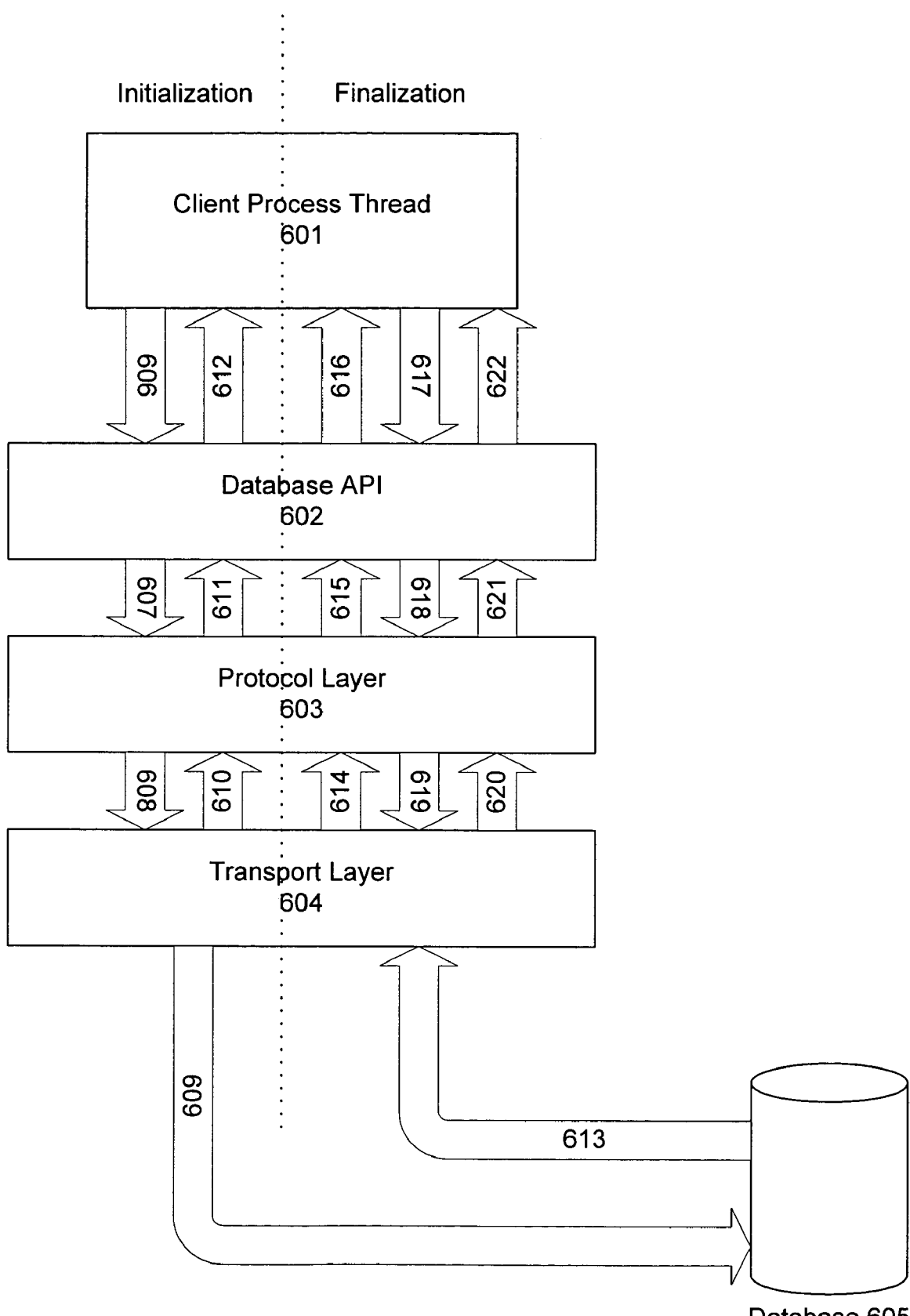
FIG. 6 illustrates an asynchronous call to a database, in which a calling thread can continue to execute in the interval between a call and return of results from a database.

An asynchronous database API can be implemented as shown in FIG. 6. However, to facilitate the explanation of such an asynchronous database API implementation, it is instructive to begin with a brief explanation of prior art methods for calling a remote database function. In this regard, FIG. 5 provides the general method in use today for calling a database function.

Referring to FIG. 5, a client process thread 501 requests some function that is provided by a database 505. This request is in the form of a call 506 to a database API 502. The call 506 may request data, or specify some service that the client process 501 wants the database 505 to perform. Once the call 506 is made, it is processed by software of several varieties, which is typically conceptualized as residing in two layers: a protocol layer 503 and a transport layer 504. A call 506 to an API 502 may be first processed by a protocol layer 503, as represented by the transmission arrow 507. In general, the protocol layer 503 is designed to convert the desired work to be done for the client process thread 501, as represented by the call 506, into a message for the database 505. Such a message could set forth, for example, the particular operation requested of the database in terms that are readable by the database software.

The transmission arrow 508 represents passing the message generated by the protocol layer 503 to the transport layer 504. The transport layer 504 may perform a variety of functions in connection with passing the message generated by the protocol layer 503 to the database 505. In a standard arrangement, the transport layer 504 may engage in an encryption protocol, such as the Kerberos protocol, in which a session key is obtained from a Key Distribution Center prior to accessing a desired server. A transport layer 504 may further engage a transport protocol, such as familiar Transport Control Protocol and Internet Protocol ("TCP/IP") to divide a message for delivery into discrete packets that are properly addressed for their destination.

The transport layer 504 therefore sends the message generated by the protocol layer 503 to the database 505. This action is represented by the transmission arrow 509. The database 505 returns results once it has accomplished the requested service. These results are then unpackaged by the transport layer 504, and passed back to the protocol layer 503. Now the protocol layer 503 can deliver the results back to the client process thread 501.

The dotted line down the middle of FIG. 5 shows that the transmission arrows 507, 508, and 509 are all related to the original call 506 from the client process thread 501. The transmission arrows on the right, 511, 512, and 513 are all related to the original return 510. In the synchronous arrangement of FIG. 5, a client process 501 must wait between the time it sends the original call 506 and the time that it receives the final return 513. This is generally because continued execution of a client process thread 501 would result in a change of context in the client process thread 501 and the thread 501 would no longer anticipate a final return 513 if it continued to execute.

The implementation of an asynchronous database API as illustrated in FIG. 6 has the advantage of utilizing the basic layer structure from FIG. 5 that is common in the industry. Generally, the various layers illustrated in FIG. 6 provide the functions described above. However, some additional features are added that allow the client process thread 601 to continue executing between the original call 606 and the final return 622.

Note that the dotted line down the middle of FIG. 6 now separates processes associated with initialization from processes associated with finalization. The "call" and "return" of FIG. 5 have been replaced with "initialization" and "finalization" because these processes are somewhat different and more complex than the simple call and return. In this implementation, a call to the asynchronous database API 602 invokes a process that will be referred to as an "initialization method." A call to an asynchronous API indicates input parameters that may specify both a desired database function an any thread context information for later use. These input parameters are passed to an initialization method. The initialization method may validate the input parameters, build them into a message for a database 605 operation, send the message to the database 605 server, and return signal information to the client process thread 601 without waiting for an external event such as database 605 server response.

The transmission arrows 610, 611, and 612 are present to indicate an optional return of signal information to a client process thread 601. Signal information provides a client process thread 601 with a way to recognize a signal indicating the return of results from a database 605. To return to a pizza restaurant analogy, signal information is similar to providing a client process thread 601 employee with a buzzer to indicate that a database pizza is ready. When the pizza results are returned from a database 650, the buzzer can notify the client process thread. In this regard, multiple signal information buzzers could be provided to a single client process thread 601 employee, each signaling that a unique database 605 operation pizza is complete. Several exemplary varieties of signals and corresponding signal information will be discussed in detail below. Note that in various embodiments, signal information need not be returned to a client process thread 601, but can be maintained by another entity such as the initialization method.

Upon receipt of the returned signal information, as represented by the transmission arrows 612, a client process thread 605 may continue to execute. Meanwhile, the message generated by the protocol layer 603 for the database 605 can be transmitted, and the database 605 can perform the requested operation, and return the results, as indicated by the transmission arrow 612.

When the results are received from the database 605 at the transport layer 604, a signal indicating that the results are available can be propagated up through the layers to the client process thread 601. This is represented by transmission arrows 614, 615, and 616. Upon receipt of the signal, a thread 601 may initiate a process for obtaining the returned results. This process is referred to herein as a finalization method.

The finalization method can be called by a client process thread via the asynchronous database API 602. The finalization method can perform any final steps necessary to prepare the results from the database 605. Database results are generally referred to in the industry as either "output parameters" (which usually represent individual scalar values that come back as a result of the execution of the SQL statement) and "result-sets" (which represent sets of rows resulting from querying the database contents). Clearly both of these types of results as well as any other results that may return from a database are appropriate for use with the invention. A finalization method can prepare these results for use by a client process thread 601. It can also deliver such prepared results to the thread 601. The delivery of prepared results from a finalization method back to a client process thread 601 is indicated by the transmission arrows 620, 621, and 622.

The receipt of database results prepared by the finalization method at the client process thread 601, as represented by transmission arrow 622 marks the end of the asynchronous interaction with the database API 602. The client process thread 601 has requested services from a database 605, optionally received signal information, and continued to execute during the time the request was transmitted, processed, and returned. The client process thread 601 then received a signal corresponding to the signal information, and initiated a finalization method to retrieve the database 605 results. The database 605 results were returned to the client process thread 601, which may then continue executing as necessary.

Detailed Description of Various Embodiments

The following detailed description of various embodiments of the invention generally follows the overview of the invention, above, explaining and expanding upon the components and aspects of the invention related therein, and presenting related and more specific components and aspects of the invention in detail.

Exemplary asynchronous database API settings. An asynchronous database API is useful in a range of settings. The following brief discussion is intended to outline various exemplary settings in which the asynchronous database API, as described generally in the above overview and further in the detailed embodiments below, is considered especially useful. Other settings for use of embodiments of the invention will undoubtedly be found as the industry continues to present new problems and demands for database access.

Figure 7:
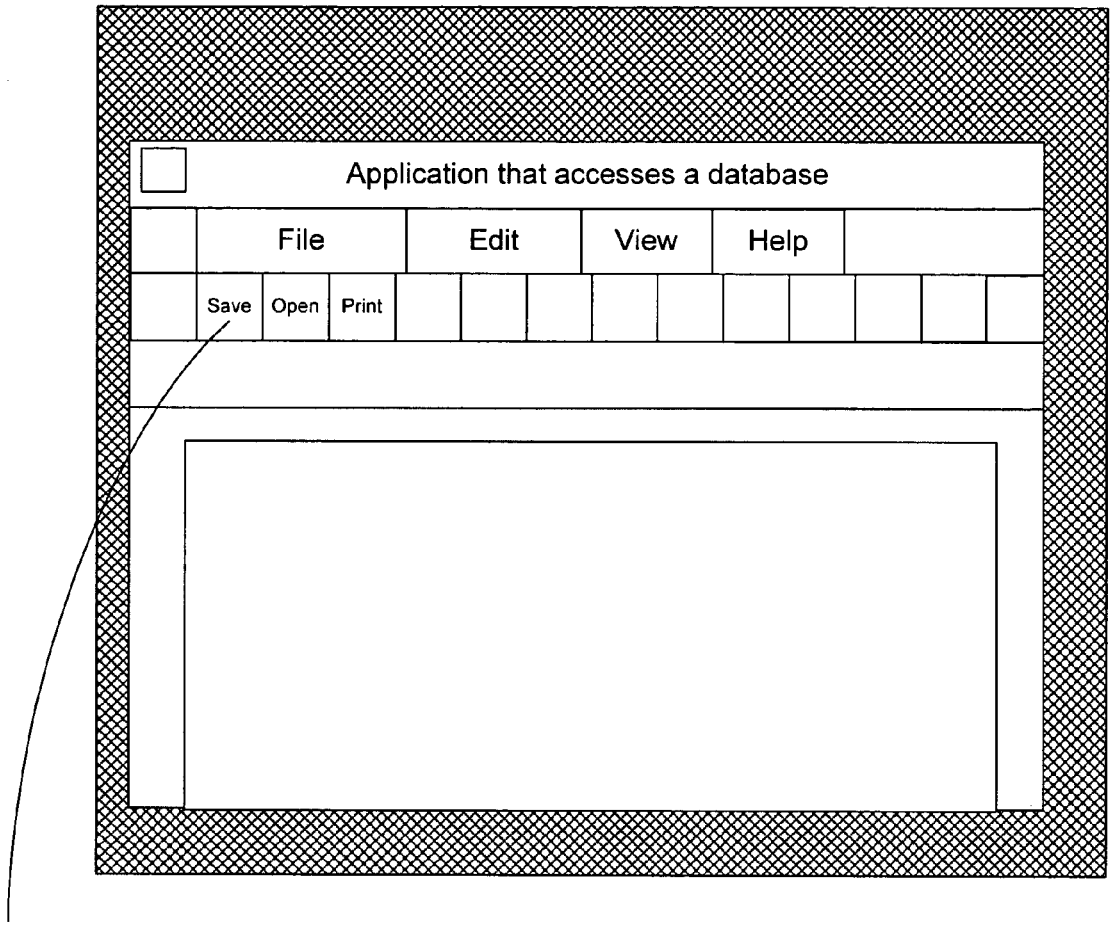
FIG. 7 illustrates an exemplary scenario for use of the asynchronous database API, in which information in a database is accessed upon commands entered from a GUI.

A first setting for use of an asynchronous database API will be referred to herein as a Graphical User Interface ("GUI") setting. Many applications designed for use in modern computer systems have a GUI for interfacing with a human user. An exemplary GUI is presented in FIG. 7. In this setting, performing a function that causes the application to access a database, such as saving data to a database, will cause a process thread associated with the application to make a call to a database API. With a synchronous database API, the calling thread may be blocked from performing any functions while the database is accessed and the data is saved. If there is only process thread associated with the application, the user may also be forced to wait for the database operation. This situation is common in the context of file access for files that are stored on a networked database server.

When the asynchronous database API is utilized, the calling thread need not wait for the database operation. Many computer users may be habituated to not waiting for operations such a saving data, because some operating systems, such as the popular MICROSOFT WINDOWS® operating system, use asynchronous file access and network access APIs. It is considered an advantage of various embodiments of the invention to provide a database API that is similar to some asynchronous operating system APIs. When an asynchronous database API is used, a user's experience of accessing databases from a GUI can be similar to the user experience of accessing operating system file systems from a GUI. Likewise, features designed into process threads for accessing operating system file systems can be utilized to access database servers.

Figure 1:
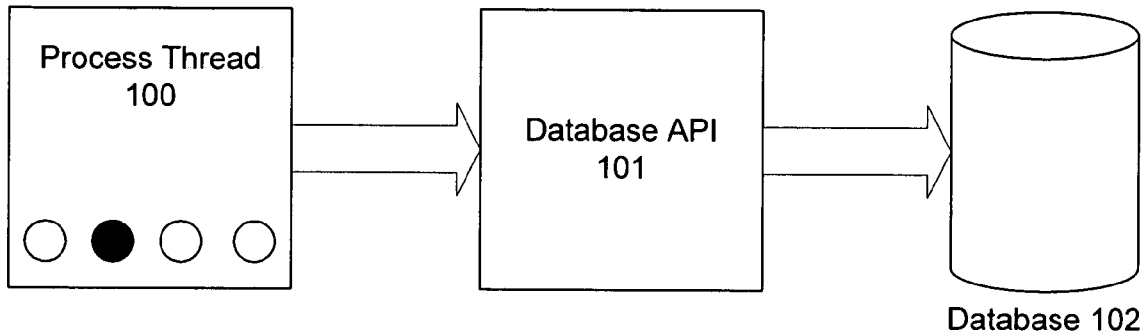
FIG. 1 illustrates a prior art synchronous database API, in which a calling thread waits for results from a database prior to continuing operations.
Figure 1:
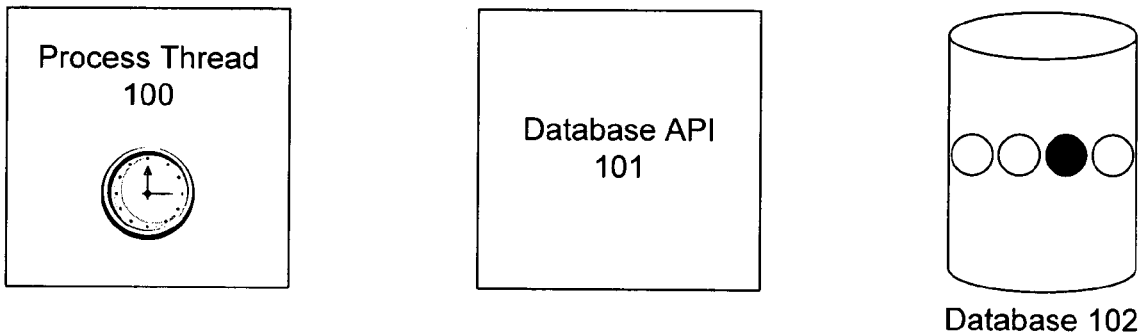
Figure 1:
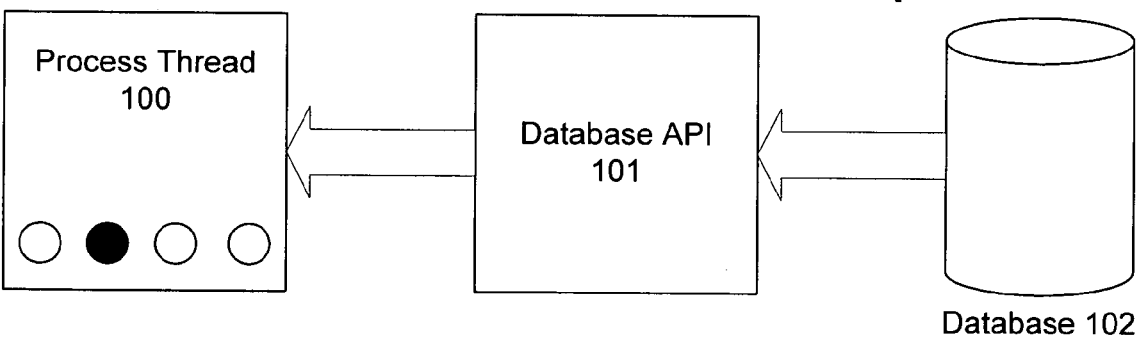
Figure 2:
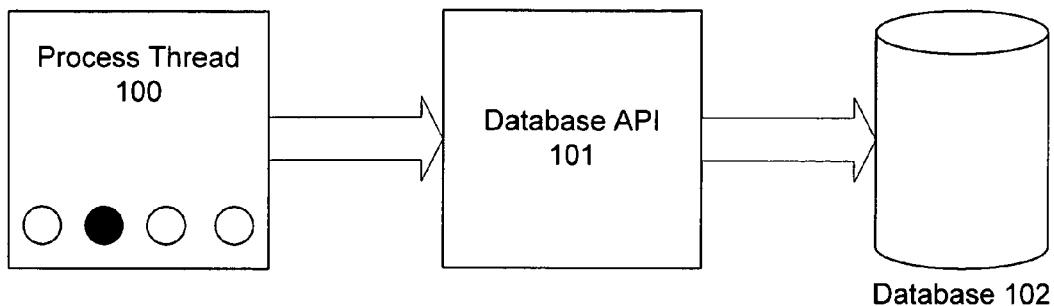
FIG. 2 illustrates a prior art synchronous database API that is used in conjunction with a waiting thread, so a calling thread can continue executing without waiting for the database. Such a waiting thread consumes additional system resources, however.
Figure 2:
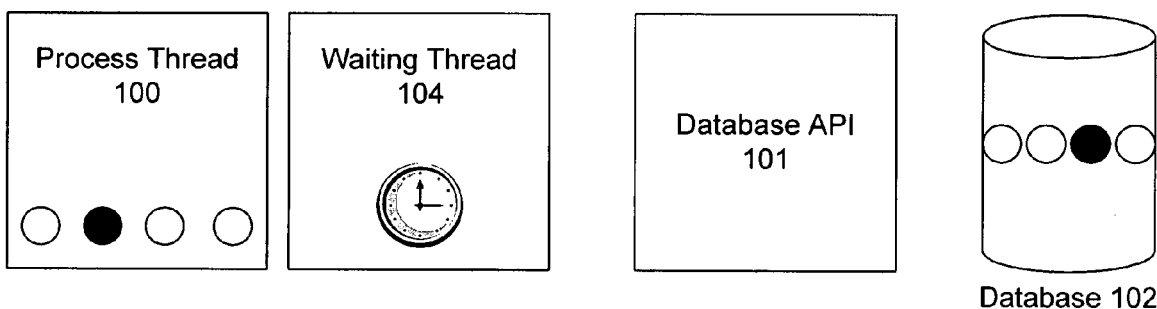
Figure 2:
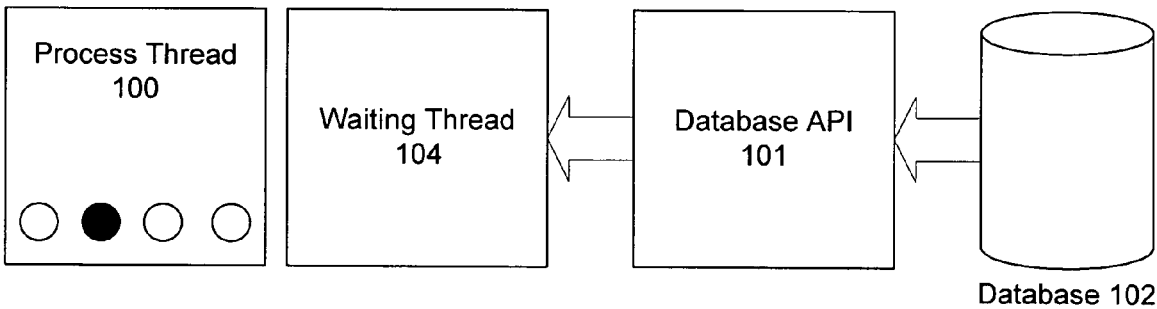
Figure 3:
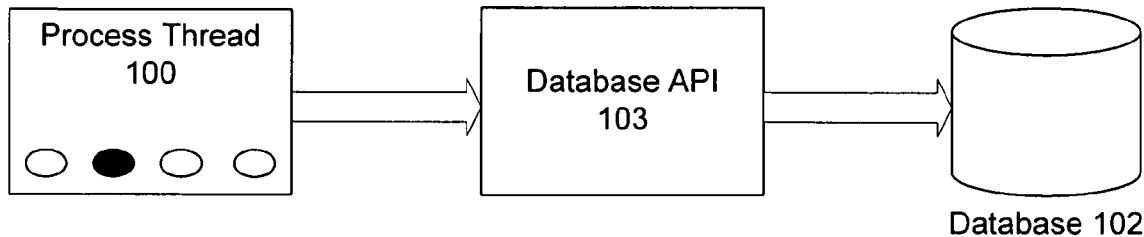
FIG. 3 illustrates a prior art synchronous database API that implements polling, or a calling thread returning periodically to a database to determine if an operation is complete.
Figure 3:
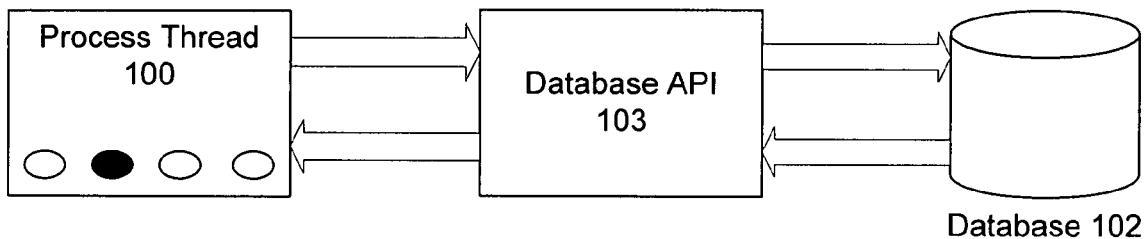
Figure 3:
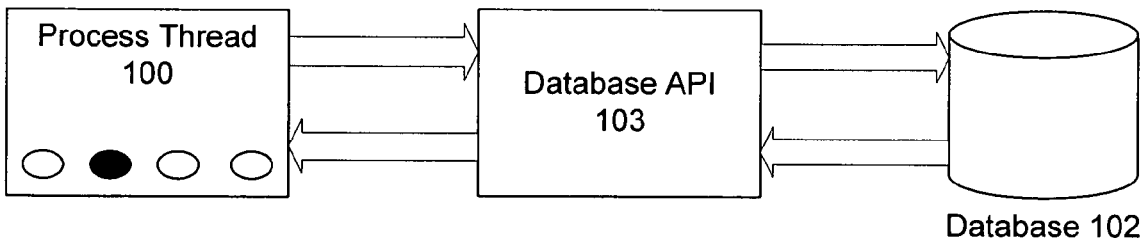
Figure 4:
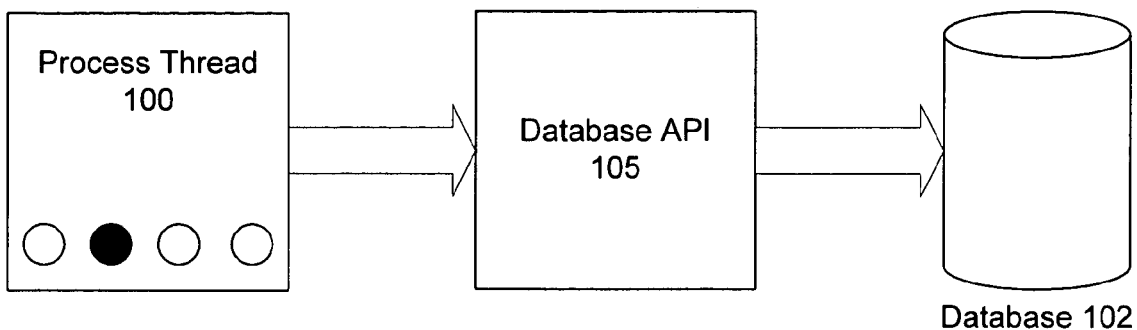
FIG. 4 illustrates an asynchronous database API. A calling process thread can continue operations without waiting for the database to return results.
Figure 4:
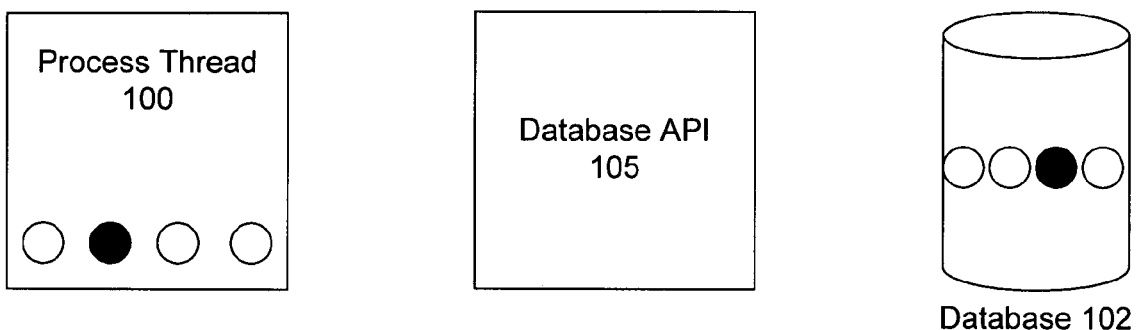
Figure 4:
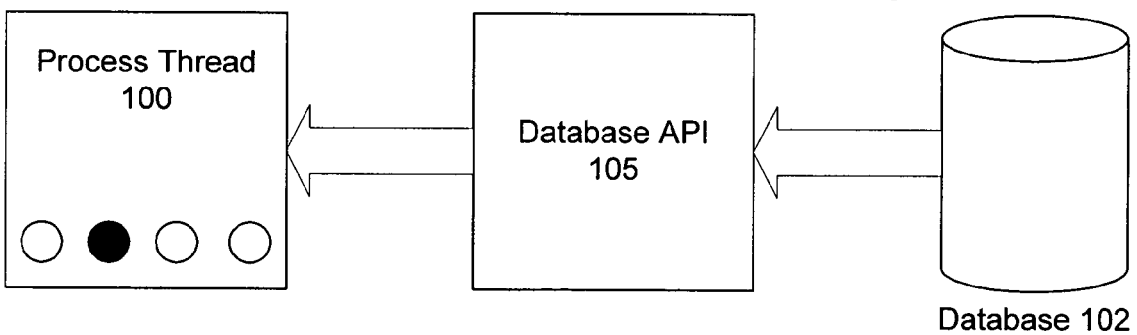

Note that the possibility of opening multiple threads, as described in the background section in connection with FIG. 2, has accomplished an illusion of an asynchronous API in the prior art for applications that use such multiple threads. As mentioned in the background, this illusion is not as good as a truly asynchronous database API because each additional thread consumes system resources. A brief description of processes and threads will serve to point out the additional resources that are consumed with such a solution.

An instance of an application is known as a process. Every process has at least one thread, the main thread, but can have many. Each thread represents an independent execution mechanism. Any code that runs within an application runs via a thread. In a typical arrangement, each process is allotted its own virtual memory address space by an operating system. All threads within the process share this virtual memory space. Multiple threads that modify the same resource must synchronize access to the resource in order to prevent erratic behavior and possible access violations. In this regard, each thread in a process gets its own set of volatile registers. A volatile register is the software equivalent of a CPU register. In order to allow a thread to maintain a context that is independent of other threads, each thread gets its own set of volatile registers that are used to save and restore hardware registers. These volatile registers are copied to/from the CPU registers every time the thread is scheduled/unscheduled to run by a typical operating system.

In addition to the set of volatile registers that represent a processor state, typical threads also maintain a stack for executing in kernel mode, a stack for executing in user mode, a thread local storage ("TLS") area, a unique identifier known as a thread ID, and, optionally, a security context. The TLS area, registers, and thread stacks are collectively known as a thread's context. Data about the thread's context must be stored and accessible by a processor that is executing a thread, so that the processor can schedule and execute operations for the thread.

In light of these resources that must be maintained by a computer for running threads, it will be acknowledged that threads are not "free," they consume a significant amount of system resources and it is desirable to minimize the use of additional threads. More specifically and with reference to the above discussion of threads, each thread consumes a portion of system memory that cannot be moved to a new location, and is therefore a resource-intensive use of memory. Operations for each running thread must be scheduled for execution either serially or on a priority basis, and time spent scheduling operations, rather than performing operations, consumes processor resources. Each thread is allotted an amount of processor time based on the number of running threads, so more running threads will reduce the amount of processor time per thread.

Figure 8:
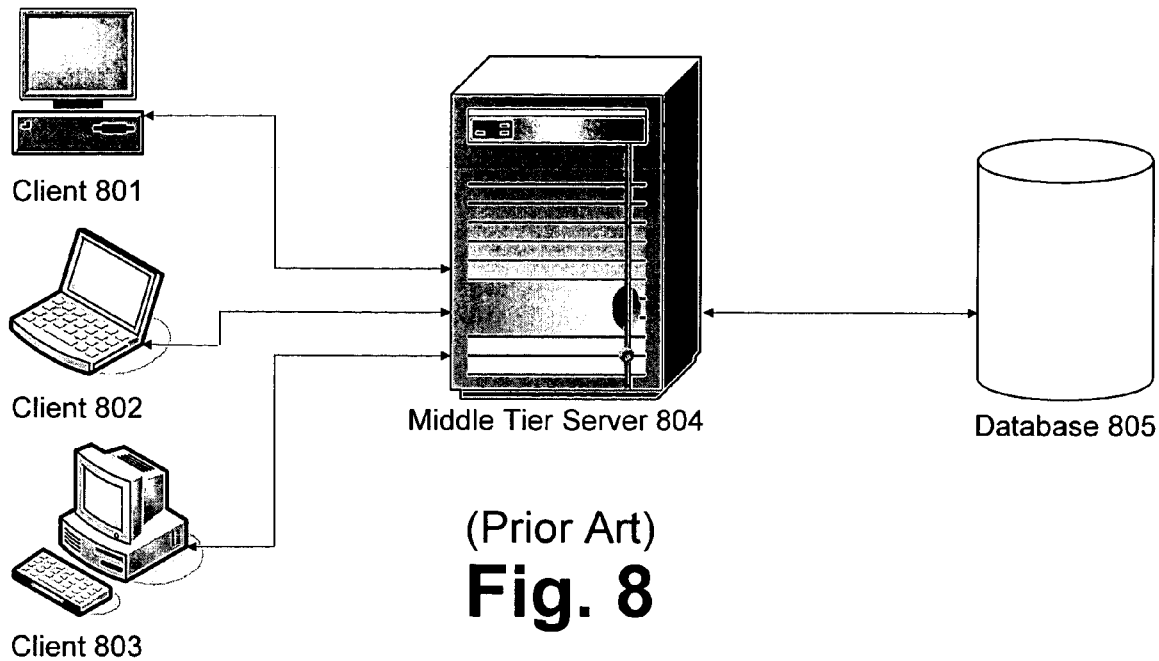
FIG. 8 illustrates an exemplary scenario for use of the asynchronous database API, in which a middle tier server processes requests from client computers, and wherein the requests require access to a database.

A second setting for use of an asynchronous database access API will be referred to herein as a high-concurrency setting. This setting can be generally understood with reference to FIG. 8, FIG. 9, and FIG. 10. FIG. 8 shows a familiar prior art situation in which numerous client computers 801, 802, and 803 access a server 805 that processes requests on behalf of the client computers 801, 802, and 803. These requests could be for example to a bank server for data about client bank accounts, to a music server maintaining a website for songs, a movie server for downloadable DVDs, an online library server for electronic books, or a scientific information server for archived weather or oceanographic information. The situations in which client computers 801, 802, and 803 access a server 804 to perform requests on behalf of the client computers 801, 802, and 803 are as diverse as the scope of human interests.

Some requests from client computers 801, 802, and 803, including many of those suggested above, may involve access to a database 805. This arrangement is known as a three-tier system—therefore server 804 is referred to in FIG. 8 as a middle tier server 804. The middle tier server 804 is an intermediary between client computers 801, 802, and 803 and database 805. In today's network environments, the number of client 801, 802, and 803 requests that require database services may be at one time very small, and at another time enormous. Thus, it is desirable to design a system such as that of FIG. 8 to be highly scalable, allowing the system to fluctuate efficiently between few and many client 801, 802, and 803 demands.

Figure 9:
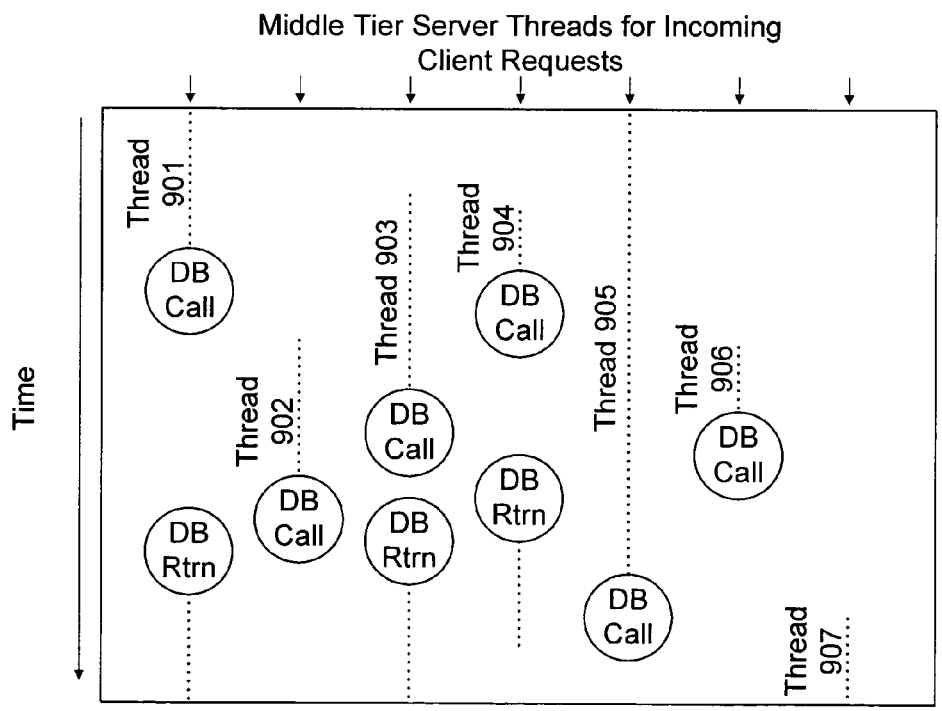
FIG. 9 illustrates the threads opened by a middle-tier server processor in the setting of FIG. 8 when a synchronous API is used.

FIG. 9 illustrates prior art techniques for managing incoming client requests. The box of FIG. 9 represents processor activity in a middle tier server 804 such as that of FIG. 8. As discussed above, a processor can manage multiple open threads at once. The vertical dotted lines in FIG. 9 represent executing threads, while the arrows above the box indicate threads that are open (though not necessarily executing) during the illustrated time period. The "DB Call" is a call to a database, such as database 805. The "DB Return" represents returned results from a database 805. In a prior art situation such as that of FIG. 9, threads that call a database 805 may be required to wait on a database 805 return before continuing to execute. For example, thread 901 makes a call to a database 901 and waits for a database 805 return. In the meantime, a new client (such as client computer 801, 802, and 803) request arrives at the middle tier server 804. In a situation where there are no available threads to handle the incoming client 801, 802, and 803 request, the middle tier server 804 has two options: it can open a new thread, such as thread 902 to manage the client 801, 802, and 803 request, or it can simply not accept the client 801, 802, and 803 request.

FIG. 9 illustrates a middle tier server 804 that opts to open a new thread 902 rather than deny the client 801, 802, and 803 request. While this choice is viable when there are relatively few client 801, 802, and 803 requests, it becomes less practical when an enormous number of client 801, 802, and 803 requests are received by the server 804. As described above, opening new threads is a drain of memory and processor resources, and performance suffers if these resources are spread too thin. In the simplified illustration of FIG. 9, there are seven open threads in the middle tier server 804 to manage seven hypothetical client 801, 802, and 803 requests.

Figure 10:
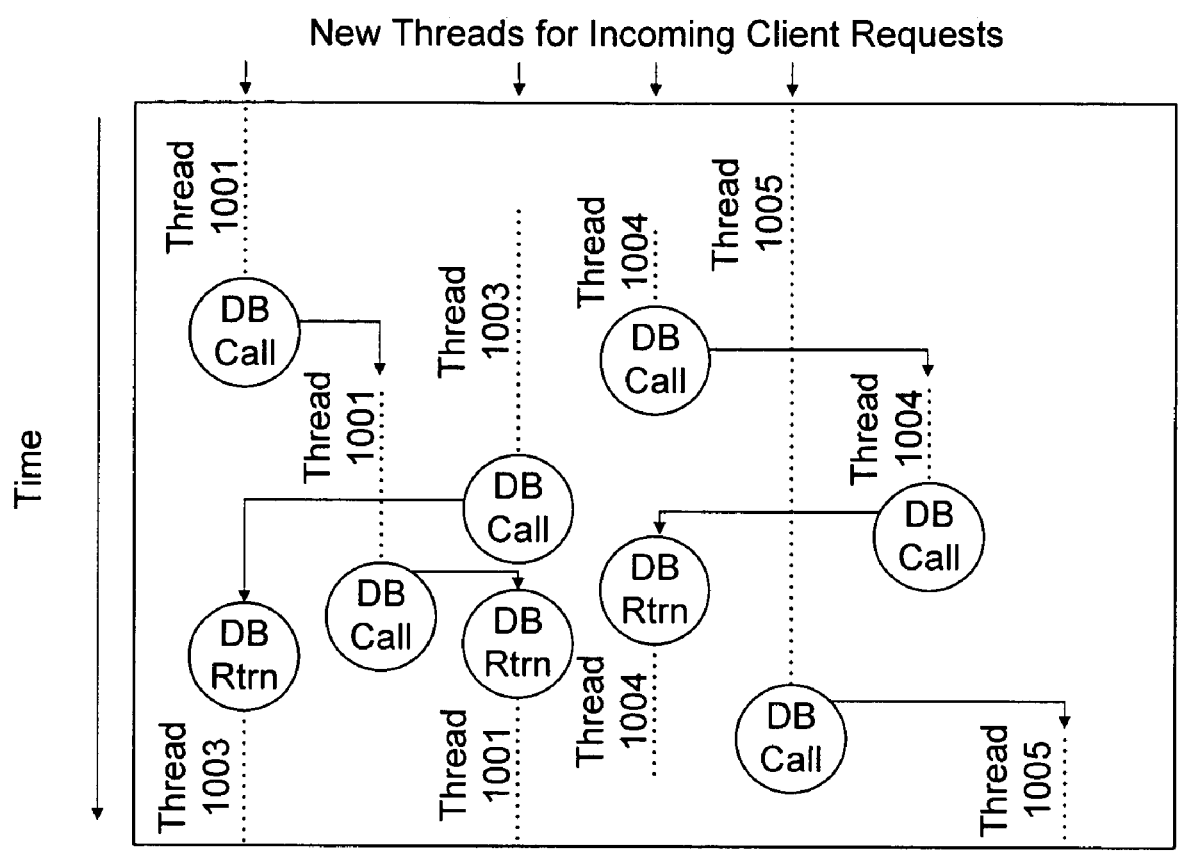
FIG. 10 illustrates the threads opened by a middle-tier server processor in the setting of FIG. 8 when a synchronous API is used. Less threads can manage the same volume and timing of client requests.

FIG. 10 provides an illustration of how embodiments of the invention improve on the difficulties of a system with a middle tier server 804 that is configured to with a synchronous API, resulting in the situation illustrated in FIG. 9. Like FIG. 9, FIG. 10 can also operate in a prior art setting such as that of FIG. 8, in which client computers 801, 802, and 803 request services from a middle tier server 804 and the middle tier server 804 in turn requests services from a database 805. FIG. 10 diagrams the open threads in such a server 804 when the server 804 takes advantage of an asynchronous API in accordance with the techniques of the invention. Note that the processor in FIG. 10 can manage the same incoming requests from clients 801, 802, and 803, at the same times with only four open threads 1001, 1003, 1004, and 1005 instead of the seven open threads 901, 902, 903, 904, 905, 906, and 907 of FIG. 9.

The threads in FIG. 10 can continue execution after making a call to a database 805. Therefore they are free to take up incoming client 801, 802, and 803 requests. Note that embodiments of the invention do not require a thread, such as thread 1001 to return to a particular client request once results are returned from a database 805. Instead, thread 1001 can call a database function, then proceed to another incoming client request, call another database function, and proceed to yet another client request. In the meantime, results may return from the database 805 for one of the calls made by thread 1001. Another thread such as thread 1003 may pick up the returned results and continue executing the client request. Embodiments of the invention that allow decoupling of threads and calls in this way can be achieved by designing either an initialization method or finalization method that provides proper context for a thread that continues operations on the client 801, 802, and 803 request once results are returned from a database 805. Context information for a particular operation or client request can be stored when a database call is made, and on completion a thread con be directed to the stored context, as will be described in greater detail below. By allowing threads to handle other tasks instead of waiting for results from a database, the asynchronous database API helps systems such as that of FIG. 8 improve scalability by managing more client requests with less open threads.

Figure 11:
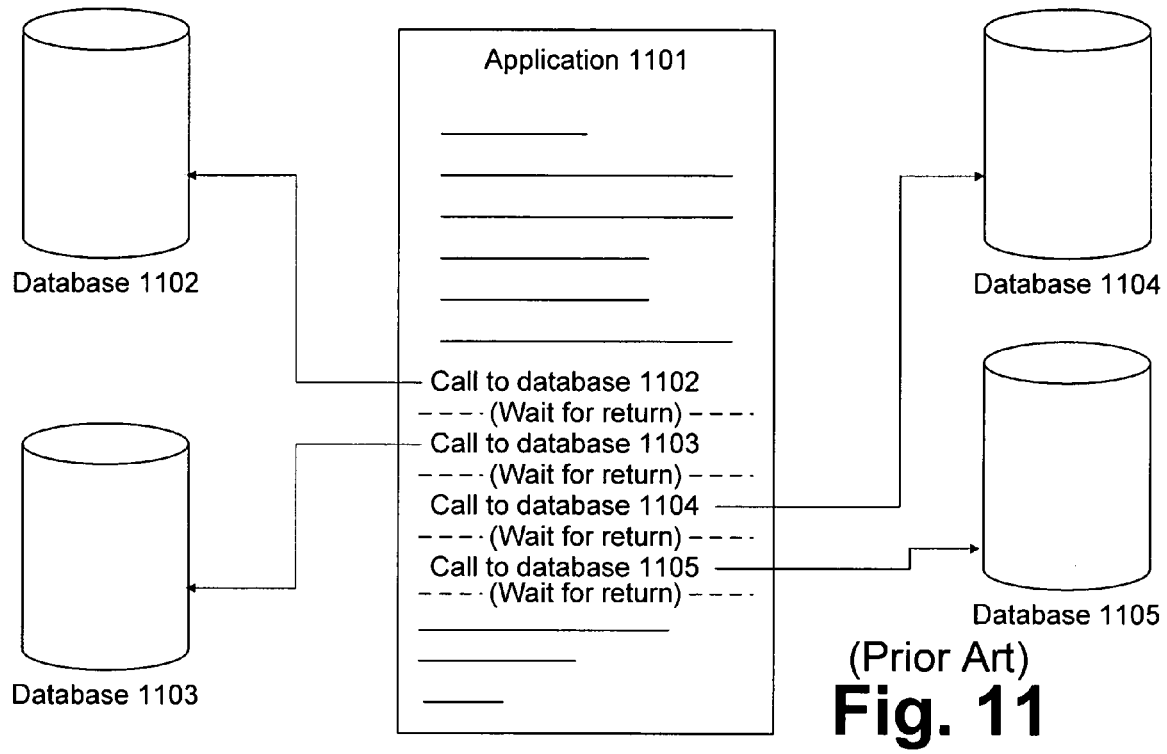
FIG. 11 illustrates an exemplary scenario for use of a database API, in which a synchronous database API is used and as a result an application is written to make multiple database calls serially rather than simultaneously, resulting in potentially inefficient use of database resources.
Figure 12:
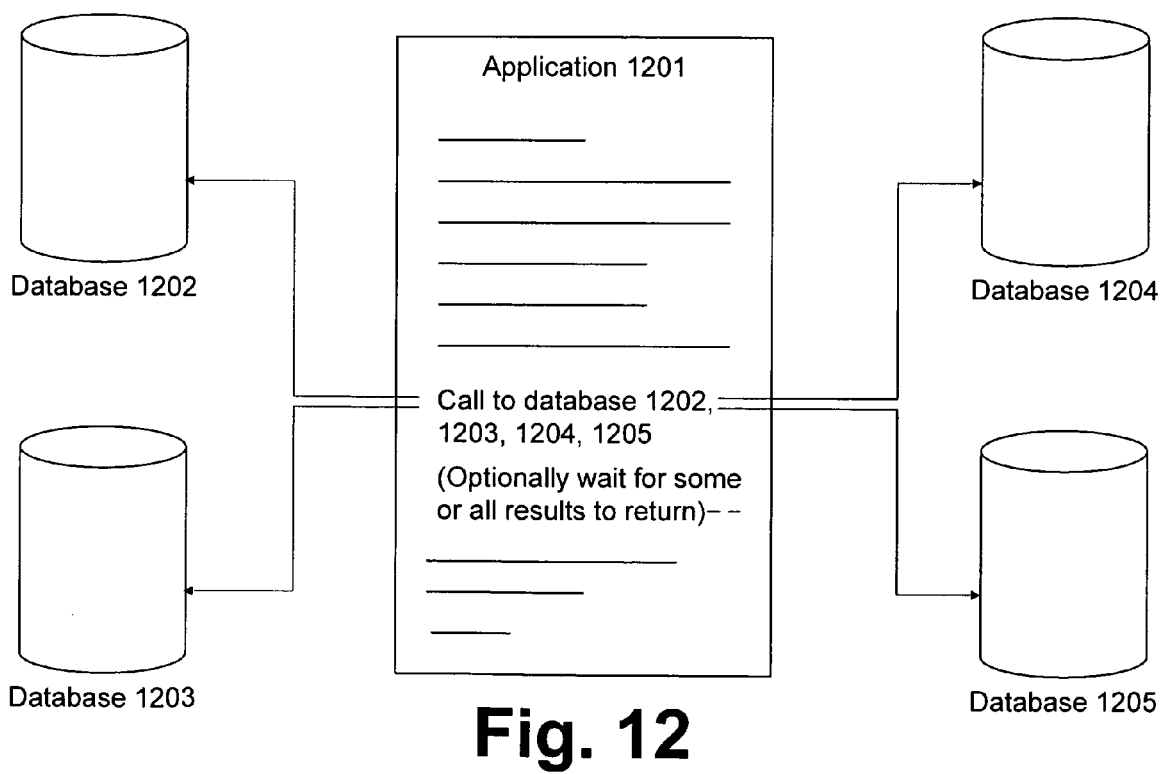
FIG. 12 illustrates an exemplary scenario like that of FIG. 10 in which an asynchronous database API is used instead of a synchronous database API, allowing an application to make multiple database calls simultaneously.

A third an final exemplary likely setting for use of the asynchronous database API in accordance with the techniques set forth herein is illustrated in FIG. 11 and FIG. 12. This setting is referred to as the parallel database calls setting. Once again, a prior art figure is provided—FIG. 11—for comparison with a system that uses the asynchronous database API, clearly demonstrating the improvements over the prior art. FIG. 11 portrays an application 1101 that can be thought of, for simplicity, as a single application thread 1101 designed for execution on a processor. The horizontal lines in the application 1101 are intended to depict lines of code that provides function associated with the application 1101. The calls to the databases 1102, 1103, 1104, and 1105 are application code that is depicted in greater detail for the purpose of demonstrating aspects of the application 1101 for comparison with application 1201.

In this regard, application 1101 makes a series four exemplary calls to databases. Although different databases are illustrated, these calls could be to the same database and the same benefits of the invention would be present. When a synchronous database API is used, as in FIG. 11, application thread 1101 makes a first call to a database 1102, and then waits for results to return. Application thread 1101 then makes a second call to a database 1103 and again waits for results to return, and so on. This is not an optimal use of resources because all of the databases, if they were to be called at once, could process the various calls in parallel. The results would be returned faster, and the application thread 1101 would provide faster service to a user.

In contrast, an asynchronous API is used in FIG. 12. This allows a programmer to conFigure an application 1201 to call multiple databases 1202, 1203, 1204, and 1205 at the same or nearly the same time. Applications that make heavy use of databases can be greatly enhanced by making better use of database resources, allowing the databases or database to process multiple requests at once.

Sometimes, results from a database will change the course of future operations in a particular thread. For example, information returned from a first database may be needed to produce a call to a second database. In this situation, signal information can be provided to an asynchronous API that tells a thread to wait before executing further. Thus, sequence-dependent operations can be handled with and asynchronous database API as desired by the designed of an application thread. An exemplary use of a synchronization object to detect operation completion is provided below. The example below enables compound waits and other advanced scenarios. This sample starts two database operations and then waits for both to finish:

```
using(SqlConnection conn1 =
        new SqlConnection("server=mysvr; integrated security=true"))
using(SqlConnection conn2 =
        new SqlConnection("server=mysvr; integrated
```

-continued

```
security=true")) {
    conn1.Open( );
    conn2.Open( );
    SqlCommand cmd1 = new SqlCommand(
        "UPDATE Customers SET Discount = 0.01
        WHERE State = 'WA'",
conn1);
    SqlCommand cmd2 = new SqlCommand(
        "UPDATE Products SET Price = Price * 0.98", conn2);
    // start a non-blocking execution
    SqlAsyncResult ar1 = cmd1.BeginExecuteNonQuery( );
    SqlAsyncResult ar2 = cmd2.BeginExecuteNonQuery( );
    // wait for both to finish
    WaitHandle [ ] handles = new WaitHandle [ ]
    { ar1.AsyncWaitHandle,
                    ar2.AsyncWaitHandle };
    WaitHandle.WaitAll(handles);
    // both statements are done here, process results, if any
    cmd1.EndExecuteNonQuery(ar1);
    cmd2.EndExecuteNonQuery(ar2);
}
```

Asynchronous database API implementation information. First, applications can perform any database operation asynchronously with the asynchronous database API. Modern database operations comprise a large variety of tasks in addition to the data storage and retrieval traditionally associated with databases. Some exemplary database operations that are particularly suited for use with the asynchronous database API are opening connections and executing Structured Query Language ("SQL") statements, including SQL statements that both do and do not require a return of results.

As described in the overview section, operations performed in various preferred embodiments of an asynchronous database API are accomplished in two phases: initialization and finalization. These phases may both be invoked by a calling application through calling an initialization method and a finalization method, respectively. While any programming techniques may by used to implement the functions described in this specification, the language of standard object-oriented techniques will be used to most clearly set forth aspects of the invention. Those of skill will recognize that analogous functions exist in a wide range of computer programming techniques and languages, and that the description in object-oriented terms can be accomplished in many programming languages as well as transposed into similar functions using other programming techniques.

Figure 13:
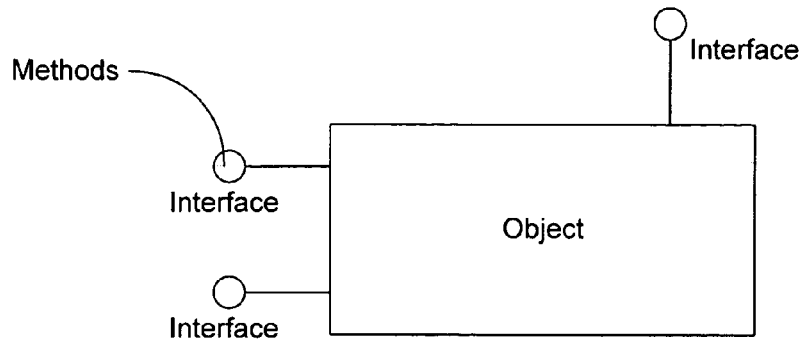
FIG. 13 illustrates an exemplary object with interfaces comprising methods for use with the object-oriented programming techniques used to describe aspects of the invention.

Object-oriented programming generally employs discrete chunks of software known as objects. Such an object is illustrated in FIG. 13. Objects generally support one or more interfaces, each of which includes methods. A method is typically a function or a procedure that performs a specific action and can be called by software—i.e., a client process thread—using the object. Such software is referred to as the client of that object. The methods that make up an interface are usually related to each other in some way. In general, clients can access the services provided by an object by invoking the methods in the objects interfaces. Clients are generally prohibited from accessing an object's data. In regard to the asynchronous database API, this API can comprise one or more of the interfaces to an object such a that of FIG. 13, with the methods described herein. The object may contain code for executing the methods called by the client threads, code that may in turn be divided generally into the standard layers illustrated in FIG. 6. Of course, functions described herein may also be provided with multiple objects designed to interface with each other.

In a simple case, an application may call a non-blocking initialization method, continue doing something unrelated, and then come back to get the results by calling a finalization method. From the perspective of an application thread, the following exemplary algorithm may be followed:

```
using(SqlConnection conn =
            new SqlConnection("server=mysvr; integrated
security=true")) {
    conn.Open( );
    SqlCommand cmd = new SqlCommand(
        "UPDATE Customers SET Discount = 0.01
        WHERE State = 'WA'",
conn);
    // start a non-blocking execution
    SqlAsyncResult ar = cmd.BeginExecuteNonQuery( );
    // statement is now executing in the database server
    // ... do some work in the meanwhile...
    // finish the operation; if not ready, this will block until done
    cmd.EndExecuteNonQuery(ar);
}
```

If the database operation involved fetching data, a similar exemplary algorithm may be employed in the client application:

```
using(SqlConnection conn =
            new SqlConnection("server=mysvr; integrated
security=true")) {
    conn.Open( );
    SqlCommand cmd = new SqlCommand(
        "SELECT * FROM Customers WHERE State = 'WA'", conn);
    // start a non-blocking execution
    SqlAsyncResult ar = cmd.BeginExecuteReader( );
    // statement is now executing in the .database server
    // ... do some work in the meanwhile...
    // finish the operation; if not ready, this will block until done
    SqlDataReader r = cmd.EndExecuteReader(ar);
    // process result-set here ...
}
```

In addition to requesting operations asynchronously, a running asynchronous operation can be polled asynchronously by a client application by employing the following exemplary algorithm:

```
using(SqlConnection conn =
            new SqlConnection("server=mysvr; integrated
security=true")) {
    conn.Open( );
    SqlCommand cmd = new SqlCommand(
        "UPDATE Customers SET Discount = 0.01
        WHERE State = 'WA'",
conn);
    // start a non-blocking execution
    SqlAsyncResult ar = cmd.BeginExecuteNonQuery( );
    // statement is now executing in the database server
    // ... do some work in the meanwhile, polling for completion
    // from time to time
    while(!ar.IsCompleted) {
        // ...do work here...
    }
    // if ar.IsCompleted is true, it's guaranteed this will not block
    cmd.EndExecuteNonQuery(ar);
}
```

Figure 14:
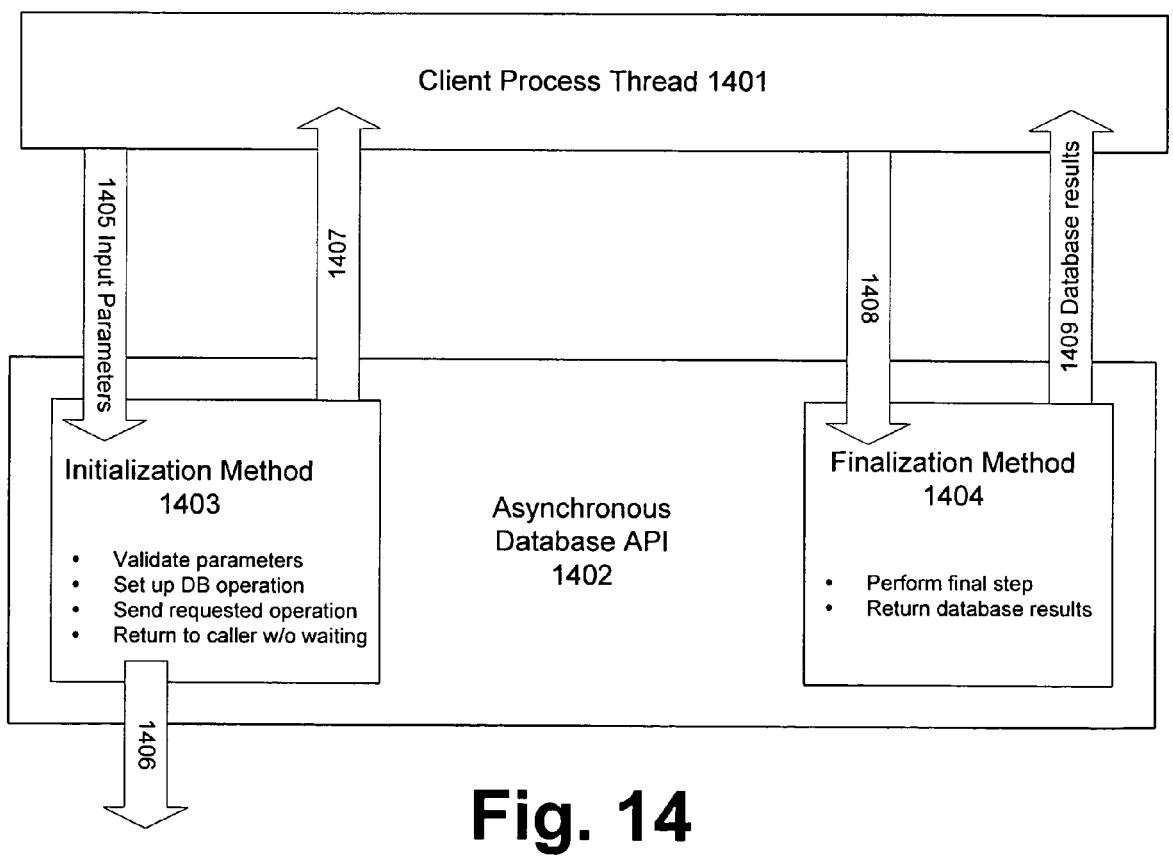
FIG. 14 illustrates a client application thread invoking an initialization method for calling database services, and subsequently invoking a finalization method for obtaining database results.

Referring now to FIG. 14, a calling client process thread 1401 using the asynchronous database API 1402 can first invoke an initialization method 1403 for a desired database operation. This invocation is illustrated as a transmission arrow 1405. Such an invocation 1405 can be accompanied by any input parameters, as shown, that a database may need for carrying out the requested operation. The initialization method 1403 may then validate the input parameters, set up the database operation, send a request for the operation to a database server, and return 1407 to the caller 1401 without waiting for any external event such as server response.

As part of returning to a caller 1401, an initialization method 1403 can optionally provide signal information. Signal information can be used by a client process thread to recognize that results have returned from a database. Signal information should be distinguished from a signal itself. Signal information provides a client thread with any information necessary to recognize a subsequent signal. Signal information may take any form, and in various embodiments need not be used at all. Several techniques for signaling a client process thread 1401 of returned results from a database, including techniques that use signal information and techniques that do not, are suggested in FIG. 15, FIG. 16, and FIG. 17.

Figure 15:
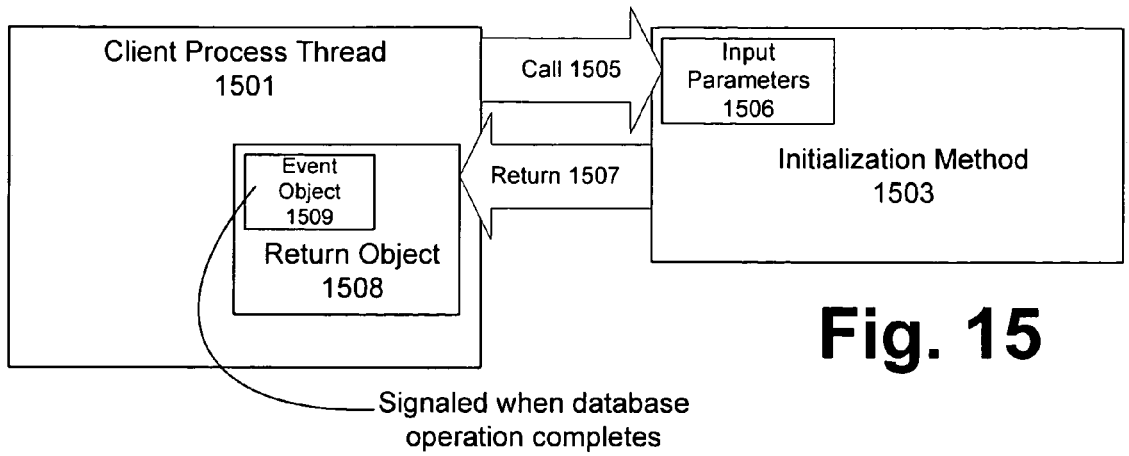
FIG. 15 illustrates an embodiment of the invention in which an event object is used to signal a client thread when a database operation is complete.

FIG. 15 provides a first exemplary form of signal information, namely an event object 1509. An event object is an object that allows threads to signal to one another that something has occurred. They are commonly used to perform work in steps. One thread performs the first step or two of a task and then signals another thread via an event to carry out the remainder of the task. Events are generally available in two varieties: manual-reset events and auto-reset events. A "SetEvent" call can be made to signal an event, and a "ResetEvent" call is generally made to unsignal it. Auto reset events are automatically unsignaled as soon as a single thread successfully waits on them; a manual-reset event must be reset through a call to ResetEvent. In MICROSOFT WINDOWS® type operating systems, a CreateEvent call to an operating system API can be made to create a new event. Other threads can access the event by calling "CreateEvent," "DuplicateHandle," or "OpenEvent." An event object 1509 can be, for example, a win32 event object or any other type of event object now in use or later developed.

The event object 1509 can be made available as a member of an object 1508 returned by an initialization method 1503. Any other process or method that receives an indication of the client process thread 1501 call 1505 to a database may also perform the function of returning an object 1508 with an event object 1509. Upon receipt of an event object 1509, a client process thread 1501 can simply wait on the event object 1509 until such time as it is signaled, or periodically poll the event object 1509 to determine when it is signaled. Upon such a determination, a client process thread 1501 can invoke a finalization method as described below.

Figure 16:
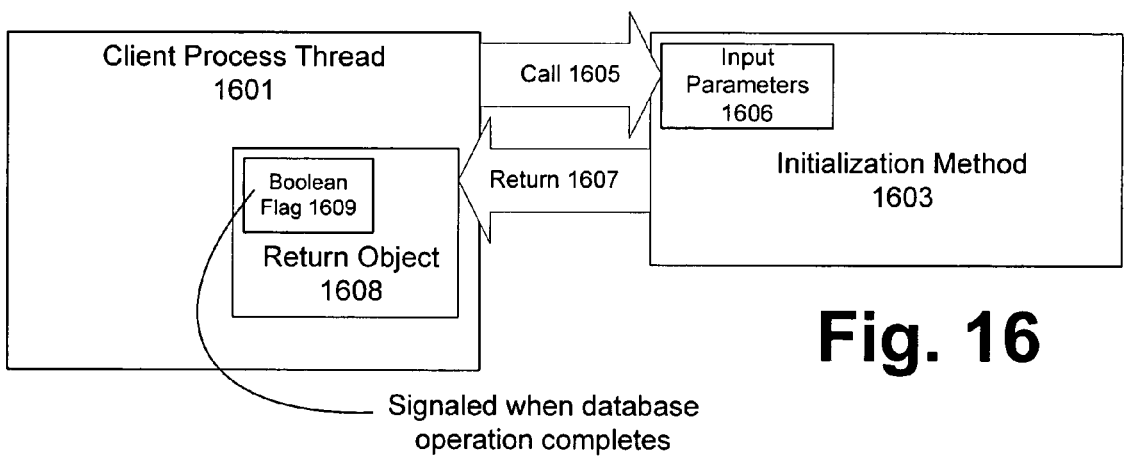
FIG. 16 illustrates an embodiment of the invention in which a Boolean flag is used to signal a client thread when a database operation is complete.

FIG. 16 provides a second exemplary form of signal information, namely a Boolean flag 1609. The Boolean flag 1609 can be made available in an object 1608 returned by an initialization method 1603. Just as in the event object of FIG. 15, any other process or method that receives an indication of the client process thread 1601 call 1605 to a database may also perform the function of returning an object 1508 with a Boolean flag 1609. The Boolean flag 1609 can indicate whether the database operation is still ongoing or completed. Completion of operations in the database can operate to update the Boolean flag to indicate completion. A client process thread 1601 can periodically poll the Boolean flag 1609 to determine when the database operation is complete. Upon such a determination, a client process thread 1601 can invoke a finalization method as described below.

Figure 17:
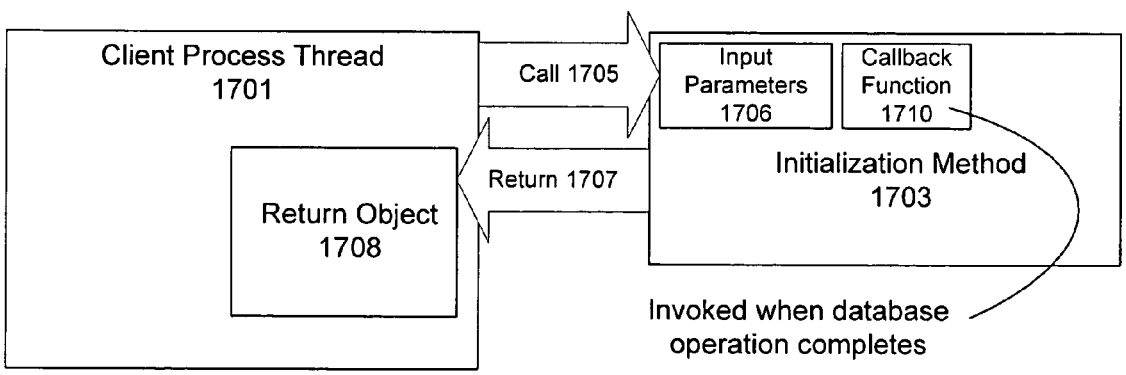
FIG. 17 illustrates an embodiment of the invention in which a callback function is used to signal a client thread when a database operation is complete.

FIG. 17 provides an embodiment in which no signal information is passed back to a client process thread 1701. Instead, a callback function 1710 can be passed to an initialization method 1703 when the initialization method 1703 is invoked by the client process 1701. Such a callback function 1710 can be passed to the initialization method 1703 as an argument. Thus, a callback function can be invoked when a database operation completes, and the callback function can notify a client process thread 1701 of the completion. Upon such a notification, a client process thread 1701 can invoke a finalization method as described below. The following exemplary algorithm illustrates the use of a callback by a client application:

```
using(SqlConnection conn =
            new SqlConnection("server=mysvr; integrated
security=true")) {
    conn.Open( );
    SqlCommand cmd = new SqlCommand(
        "UPDATE Customers SET Discount = 0.01
        WHERE State = 'WA'",
conn);
    // start a non-blocking execution providing a delegate to be
called
    // when done
    SqlAsyncResult ar = cmd.BeginExecuteNonQuery(
                new
AsyncCallback(myCallback));
    // statement is now executing in the database server
    // no waiting/polling required, although it can be done if
necessary
}
// this will be called when done
// it should at least call End... for the corresponding Begin...
void myCallback(IAsyncResult ar) {
    // if a return value is expected(i.e., a SqlDataReader), it will
    // be returned in the End... call
    cmd.EndExecuteNonQuery(ar);
}
```

Note that while a single client thread such as 1501, 1601, and 1701 is used in each of the examples, this is not considered a requirement of the invention. Instead, thread-affinity need not be maintained when the asynchronous API is used. Different threads can manage the initialization and finalization phases, and signal information need not be passed directly back to a client thread. Instead, signal information can be passed to any process thread that is capable of restoring the context of the calling thread and continuing execution with the returned database results. Moreover, because the different objects involved in an operation (connections, statements, etc.) do not necessarily maintain thread-affinity, an operation can be started in one thread and completed in another. The infrastructure itself can perform the completion step and callback dispatching in different threads as well. This free threaded model enables high-performance application to implement I/O queuing models where pending operations are served as they are completed in a pool of threads. While this scheme has been available in file and network I/O, it has not been used in database I/O because of the lack of an asynchronous API.

Referring back to FIG. 14, invocation of the finalization method 1404 can now be explained. Prior to discussion of the finalization method 1404, consider the procedure that has taken place so far. First, a thread 1401 invoked an initialization method 1403, which in turn sent a requested operation to a database and returned to a client thread 1401. The return 1407 may or may not have been accompanied by signal information, as described above. After this return 1407, the client thread 1407 may continue to execute indefinitely. If the database operation was one that required a return of results, however, at some point these results will return, and a client thread, such as client thread 1401—although not necessarily 1401—will be signaled optionally using the signal information described in connection with exemplary FIG. 15, FIG. 16, and FIG. 17.

After such a signal, a client thread 1401 may proceed to invoke a finalization method 1404 to obtain the returned results. Upon invocation, a finalization method 1404 may first perform any final step required for the particular database operation, for example reformatting or relocating the returned results. Such a final step can be non-trivial and in many scenarios may involve reading multiple packets off the underlying transport (network or shared memory) and parsing the contents according to a database IPC protocol. Next, the finalization method 1404 can return database results 1409 to a caller 1401. This marks the completion of a database access operation involving the asynchronous database API 1402.

Exemplary implementation of an asynchronous database API. Various implementations of the techniques described herein are feasible and will vary with operating systems and particular database software involved. The following exemplary implementation demonstrates a variety of initialization and finalization methods comprising an asynchronous database API for use with the MICROSOFT SQL SERVER® database software.

1.1 Connection string: A connection string keyword, e.g., "async", can be "true" or "false, and default to "false". If async=false, any attempt to use an asynchronous API will return in an InvalidOperationException. If async=true, both synchronous and asynchronous operations can be allowed.

1.2 SqlConnection Class—1.2.1 BeginOpen Method:
IAsyncResult BeginOpen( )
IAsyncResult BeginOpen(AsyncCallback callback, object state)

Starts the process of opening a database connection asynchronously. When the connection is finally open and all the initial hand-shake is finished, the operation is marked as completed, events are signaled as needed, and the user callback is invoked if provided.

Parameters: callback: a delegate that will be invoked when the open operation is completed. Use null to indicate that no callback is needed. state: a user-defined state object that will be passed to the callback when invoked Returns: An IAsyncResult that can be used to poll and/or wait for results; this value is also needed when invoking EndOpen.

1.2.2 EndOpen Method
void EndOpen(IAsyncResult ar)

Finishes the process of opening a connection asynchronously. If the operation has not finished yet, this method blocks until it completes. Users can verify if the open operation is done by using the IAsyncResult instance returned by BeginOpen. Distributed transaction context detection and enlistment occurs during this phase, so if the connection should be enlisted in a distributed transaction, the EndOpen method should be called in proper transactional context. Even if the initial open operation happens asynchronously, the DTC enlistment—if needed—will be performed in blocking mode.

Parameters: ar: the IAsyncResult returned by BeginOpen.
Throws: SqlException: any error that occurred while opening the connection 1.3 SqlCommand Class—1.3.1 BeginExecuteNonQuery Method
IAsyncResult BeginExecuteNonQuery( )
IAsyncResult BeginExecuteNonQuery(AsyncCallback callback, object state)

Initiates the asynchronous execution of the SQL statement described by this command. Note that command text and parameters are sent to the server synchronously. So if a large command or a large number parameters is sent, this method may block during writes. After the command is sent, SqlClient will return immediately without waiting for an answer from the server—that is, reads will be asynchronous.

Parameters: callback: a delegate that will be invoked when the execution is completed. Use null to indicate that no callback is needed. state: a user-defined state object that will be passed to the callback when invoked.

Returns: An IAsyncResult that can be used to poll and/or wait for results; this value is also needed when invoking EndExecuteNonQuery.

Throws: SqlException: any error that occurred while executing the statement.

1.3.2 BeginExecuteReader Method
IAsyncResult BeginExecuteReader( )
IAsyncResult BeginExecuteReader(AsyncCallback callback, object state)
IAsyncResult BeginExecuteReader(AsyncCallback callback, object state, CommandBehavior behavior)

Initiates the asynchronous execution of the SQL statement described by this command and retrieves one more result-sets from the server. Note that command text and parameters are sent to the server synchronously. So if a large command or a large number parameters is sent, this method may block during writes. After the command is sent, SqlClient will return immediately without waiting for an answer from the server—that is, reads will be asynchronous.

Although command execution in this embodiment is asynchronous, value fetching is still synchronous. This means that calls to SqlDataReader.Read( ) may block if more data is needed and the underlying network read operation blocks.

Parameters: callback: a delegate that will be invoked when the execution is completed. Use null to indicate that no callback is needed. state: a user-defined state object that will be passed to the callback when invoked. behavior: indicates different options for statement execution and data retrieval. Semantics of these options are identical of those of ExecuteReader.

Returns: An IAsyncResult that can be used to poll and/or wait for results; this value is also needed when invoking EndExecuteReader.

Throws: SqlException: any error that occurred while executing the statement.

1.3.3 BeginExecuteXmlReader Method
IAsyncResult BeginExecuteXmlReader( )
IAsyncResult BeginExecuteXmlReader(AsyncCallback callback, object state)

Initiates the asynchronous execution of the SQL statement described by this command and returns results as a single XML value. Note that command text and parameters are sent to the server synchronously. So if a large command or a large number parameters is sent, this method may block during writes. After the command is sent, SqlClient will return immediately without waiting for an answer from the server—that is, reads will be asynchronous.

Parameters: callback: a delegate that will be invoked when the execution is completed. Use null to indicate that no callback is needed. state: a user-defined state object that will be passed to the callback when invoked.

Returns: An IAsyncResult that can be used to poll and/or wait for results; this value is also needed when invoking EndExecuteXmlReader.

Throws: SqlException: any error that occurred while executing the statement.

1.3.4 EndExecuteNonQuery Method
int EndExecuteNonQuery(IAsyncResult ar)

Finishes an asynchronous execution of a SQL statement. If the operation has not finished yet, this method blocks until it is completed. Users can verify if the execution is done by using the IAsyncResult instance returned by BeginExecuteNonQuery. If a callback was specified in BeginExecuteNonQuery, this method is typically called from within the callback.

Parameters: ar: the IAsyncResult instance returned by BeginExecuteNonQuery.

Returns: Number of rows affected (same as ExecuteNonQuery).

Throws: SqlException: any error that occurred while executing the statement.

1.3.5 EndExecuteReader Method
SqlDataReader EndExecuteReader(IAsyncResult ar)

Finishes an asynchronous execution of a SQL statement. If the operation has not finished yet, this method blocks until it's completed. Users can verify if the execution is done by using the IAsyncResult instance returned by BeginExecuteReader. If a callback was specified in BeginExecuteReader, this method is typically called from within the callback.

Parameters: ar: the IAsyncResult instance returned by BeginExecuteReader.

Returns: A SqlDataReader object that can be used to fetch the results.

Throws: SqlException: any error that occurred while executing the statement.

1.3.6 EndExecuteXmlReader Method
XmlReader EndExecuteXmlReader(IAsyncResult ar)

Finishes an asynchronous execution of a SQL statement. If the operation has not finished yet, this method blocks until it's completed. Users can verify if the execution is done by using the IAsyncResult instance returned by BeginExecuteXmlReader. If a callback was specified in BeginExecuteXmlReader, this method is typically called from within the callback.

Parameters: ar: the IAsyncResult instance returned by BeginExecuteXmlReader.

Returns: A XmlReader object that can be used to fetch the resulting XML data.

Throws: SqlException: any error that occurred while executing the statement.

2. Functionality—2.1 Async Open and StateChange Event

SqlConnection StateChange event is orthogonal to the asynchronous operation support. The implementation is free to choose whether this event fires in BeginOpen or in EndOpen.

Note that this event will never be fired without BeginOpen or EndOpen being up in the stack (that is, the event will always be fired during those function calls). Also, this event will be fired in the same thread that called the BeginOpen/EndOpen method.

The implication of the previous statement is that the StateChange event cannot be used as an alternate signaling mechanism to detect if the asynchronous operation finished. The only correct ways to detect that are the IAsyncResult.IsComplete property, the IAsyncResult.WaitHandle event object, or the callback provided to BeginOpen.

2.2 Handling Exceptions in Asynchronous Operations

Error conditions that can be detected during the initialization of the asynchronous operations are thrown in the Begin method. A good example of this is parameter validation.

However, once the operation is started, there is no longer user code up in the stack to catch exceptions, so SqlClient cannot throw one until it receives a call to the End method.

When the End method is called it will throw an exception if SqlClient found a problem while performing the asynchronous operation.

Note that as in any other managed asynchronous API, callbacks may be (and in most situations are) invoked from different threads. In this case, if the code that calls the End method doesn't catch any exception that might be thrown, then the CLR will effectively eat the exception and it will go undetected.

Correct coding practice in this scenario is catching the exception and either logging it (i.e., in server apps) or marshal the call back to the UI thread and report it there (i.e., in WinForms apps, using Form.Invoke)

2.3 Boundaries of Operations

Several behaviors in SqlClient depend on certain operations having finished. For example, the ExecuteXxx methods of a command cannot be executed until any previously executing command is finished and all its result-sets closed.

This restriction holds is asynchronous operation situations. The fact that a call to BeginExecuteXxx doesn't block the calling thread may lead the user to think that this command "is done" and another can be executed (or the same one executed again.) This is never the case: the connection open process as well as the command execution is finished when the corresponding EndXxx method is invoked, not before. If a command returns a SqlDataReader, then the reader has to be closed before the command can be reused (this is totally independent from MARS; MARS would allow multiple ongoing commands, but each individual command still adheres to the restriction).

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the asynchronous API of the present invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of a simple networked environment, the invention is not so limited, but rather may be implemented in connection with any computing environment, such as in a single computer, in a large and complex network, or in a distributed computing environment. Still further, the present invention may be implemented in or across a plurality of processing chips or devices, and storage may similarly be effected across a plurality of devices. Such devices might include personal computers, network servers, database servers, handheld devices, supercomputers, or computers integrated into other systems such as automobiles and airplanes. Therefore, the present invention should not be limited to any single embodiment, but rather should be construed in breadth and scope in accordance with the appended claims.

What is claimed:

1. A computer readable medium having stored thereon computer-executable instructions for providing an asynchronous database Application Programming Interface ("API") that allows a client application to open a database connection asynchronously, said API comprising:

instructions for an initialization method that is configured to be invoked by a client thread to request a database operation, wherein upon invocation of said initialization method, said initialization method:

initiates a return communication with said client thread without waiting for any external event, said return communication allowing said client thread to continue executing without waiting for a response from a database server associated with said database operation;

validates input parameters for said database operation;

sets up said database operation by generating database instructions based on data passed to said initialization method; and sends a request for said database operation to said database server;

instructions for signaling said client thread when said database operation is complete; and instructions for a finalization method that is configured to be invoked by said client thread, in response to said signaling, to obtain any results of said database operation, wherein upon invocation of said finalization method, said finalization method:

prepares database results for said client thread; and returns said database results to said client thread.

2. The computer readable medium of claim 1, wherein said return communication comprises an event object that can be signaled when said database operation completes.

3. The computer readable medium of claim 1, wherein said return communication comprises an object with a Boolean flag that can be signaled when said database operation completes.

4. The computer readable medium of claim 1, wherein said initialization method maintains a callback function for notifying said client thread when said database operation completes.

5. The computer readable medium of claim 1, wherein said API further comprises instructions for an execute Structured Query Language ("SQL") statement method that allows said client thread to execute a SQL statement asynchronously.

6. A computer readable medium having stored thereon computer-executable instructions for providing an asynchronous database Application Programming Interface ("API") allowing a client application to open a database connection asynchronously, said API comprising:

instructions for an initialization method, wherein said initialization method is configured to be invoked by a client thread to request a database operation, wherein upon invocation of said initialization method, said initialization method:

initiates a return communication with the client thread without waiting for any external event, said return communication allowing said client thread to continue executing without waiting for a response from a database server associated with said database operation;

validates input parameters for said database operation;

sets up said database operation by generating database instructions based on data passed to the initialization method, said database operation comprising at least one instruction to execute a Structured Query Language ("SQL") statement; and sends a request for said database operation to a database server;

instructions for signaling said client thread when said database operation is complete;

instructions for a finalization method that is configured to be invoked by said client thread, in response to said signaling, to obtain any results of said database operation, wherein upon invocation of said finalization method, said finalization method:

prepares database results for said client thread; and returns said database results to said client thread.

7. The computer readable medium of claim 6, wherein said return communication comprises an event object that can be signaled when said database operation completes.

8. The computer readable medium of claim 6, wherein said return communication comprises an object with a Boolean flag that can be signaled when a database operation completes.

9. The computer readable medium of claim 6, further comprising instructions for a callback function for notifying said client thread when said database operation completes.

10. A computer-implemented method for allowing a client application to asynchronously access database services, said method comprising:

receiving, by an Application Programming Interface (API) software executing on a computer, a client thread invocation of an initialization method, wherein said client thread invocation comprises input parameters for a database operation;

initiating, by said initialization method without waiting for any external event, a return communication to said client thread, said return communication allowing said client thread to continue executing without waiting for a response from a database server associated with said database operation;

validating, by said initialization method, said input parameters;

setting up said database operation by generating database instructions based on said input parameters, said database operation comprising at least one instruction to execute a Structured Query Language ("SQL") statement;

sending a request for said database operation to said database server;

signaling said client thread when said database operation is complete;

receiving, by said API, an invocation of a finalization method from said client thread in response to said signaling;

preparing, by said finalization method, database results for said client thread; and returning, by said finalization method, said database results to said client thread.

11. The computer-implemented method of claim 10, wherein said return communication comprises an event object that can be signaled when said database operation completes.

12. The computer-implemented method of claim 10, wherein said return communication comprises an object with a Boolean flag that can be signaled when a database operation completes.

13. The computer-implemented method of claim 10, further comprising notifying said client thread when said database operation completes by sending a callback function to said client thread.

* * * * *